(No Model.) 2 Sheets—Sheet 1.
M. P. JACOBSEN.
WAGON.
No. 528,598. Patented Nov. 6, 1894.
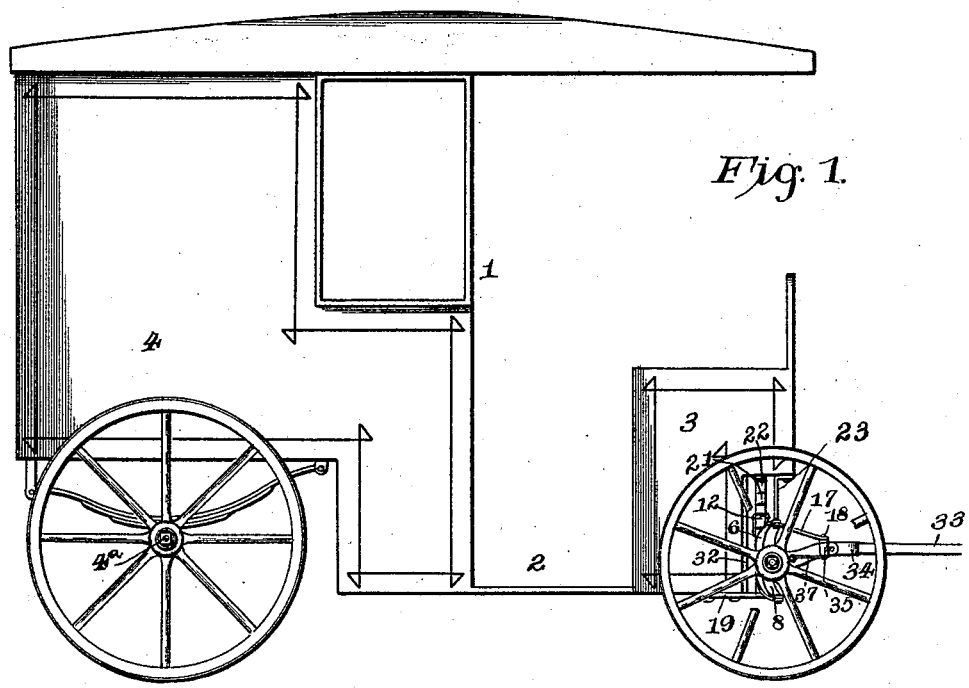
Witnesses
Chas. A. Ford,
N. F. Riley.
Inventor
Marcus P. Jacobsen,
By his Attorneys.
C. A. Snow & Co.

(No Model.) 2 Sheets—Sheet 2.
M. P. JACOBSEN.
WAGON.
No. 528,598. Patented Nov. 6, 1894.
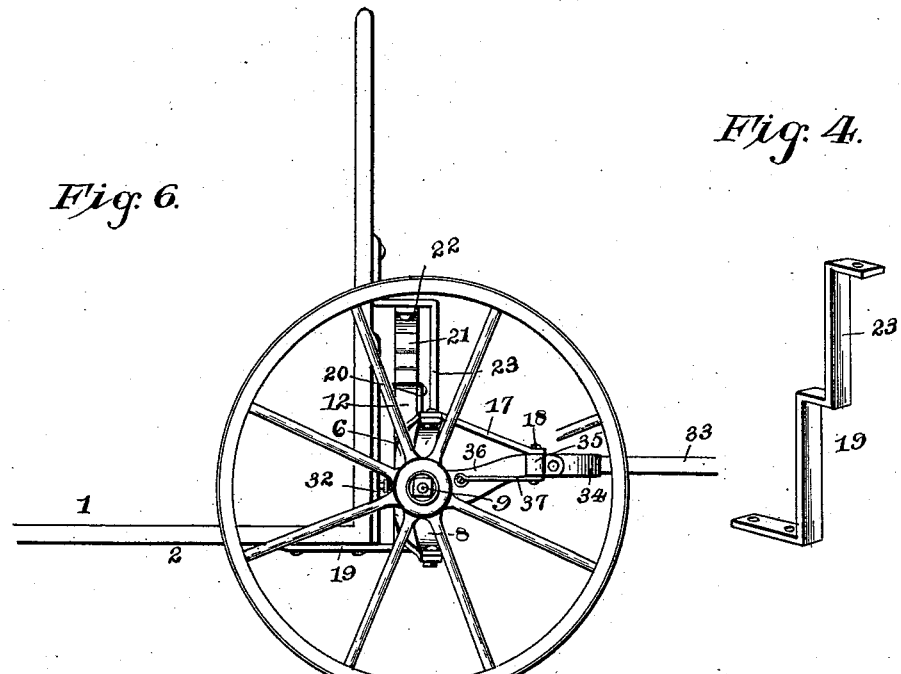
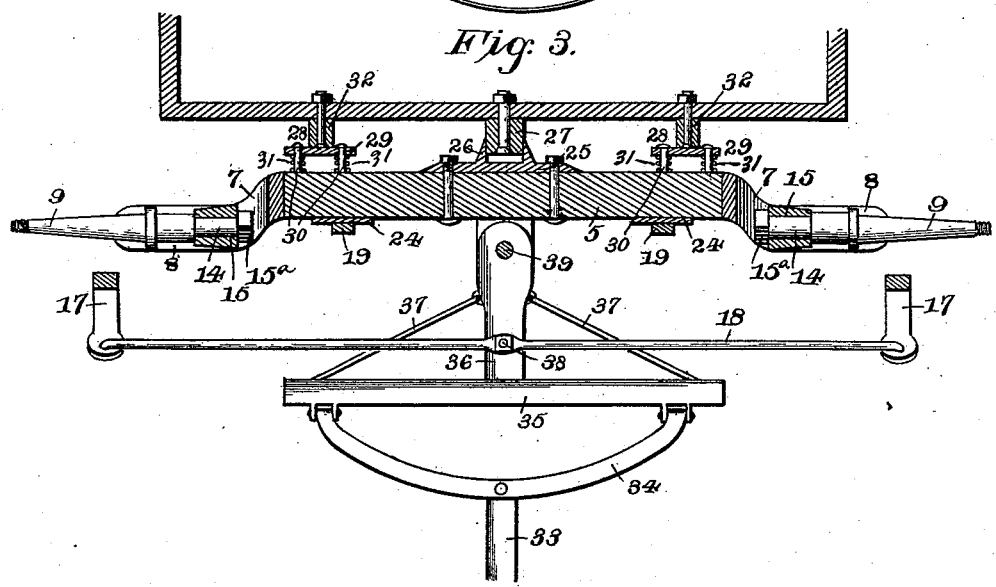
Witnesses
Chas. A. Ford
H. J. Riley
Inventor
Marcus P. Jacobsen,
By his Attorneys,
C. A. Snow & Co.

UNITED STATES PATENT OFFICE.

MARCUS P. JACOBSEN, OF JAMESTOWN, NEW YORK.

WAGON.

SPECIFICATION forming part of Letters Patent No. 528,598, dated November 6, 1894.

Application filed June 4, 1894. Serial No. 513,437. (No model.)

*To all whom it may concern:*

Be it known that I, MARCUS P. JACOBSEN, a citizen of the United States, residing at Jamestown, in the county of Chautauqua and State of New York, have invented a new and useful Wagon, of which the following is a specification.

The invention relates to improvements in vehicles.

The object of the present invention is to improve that class of vehicles employing crank axles, and having a drop portion located below the plane of the axle, and to provide a simple, inexpensive and efficient construction, whereby the front axle will be fully cushioned, but will be prevented from any rattling or jarring.

A further object of the invention is to enable the weight of the vehicle on the front axle to counterbalance the weight of the tongue, and thereby prevent strain on the necks of the draft animals, or on the connections between the tongue and the vehicle, and to avoid twisting the front axle.

The invention consists in the construction and novel combination and arrangement of parts hereinafter fully described, illustrated in the accompanying drawings, and pointed out in the claims hereto appended.

In the drawings—Figure 1 is a side elevation of a vehicle constructed in accordance with this invention. Fig. 2 is a front elevation of the front axle. Fig. 3 is a horizontal sectional view. Fig. 4 is a detail perspective view of one of the guides of the front axle. Fig. 5 is a similar view of the guide plate for preventing the front axle from moving transversely of the vehicle. Fig. 6 is a side elevation of a portion of a vehicle, illustrating a modification of the invention. Fig. 7 is a detail view of one end of the front axle.

Like numerals of reference indicate corresponding parts in all the figures of the drawings.

1 designates a vehicle having near its front an intermediate drop portion 2, forming front and rear elevated portions 3 and 4, the latter being supported on a rear axle $4^a$, and provided with side springs of ordinary construction.

The front axle of the vehicle consists of a horizontal beam 5, and upper and lower outwardly curved arms 6 and 7, arranged in pairs and having pivotally connected to them substantially similarly curved arms 8, of spindles 9. The lower curved arms 7 are formed integral with, and are extensions of a lower bar 10, which is secured to the lower face or edge of the beam 5, or body portion of the front axle; and an upper bar 11 is secured to the upper edge thereof. The upper curved arms 6 are constructed separate from the lower arms 7, and have at their lower terminals inward extensions $6^a$; and these upper arms 6 are arranged on the outer ends of the body portion of the axle, and are secured by clips 13 to upward extending arms 12 of the upper bar 11 of the axle.

The curved arms of the axle are slightly forwardly offset to arrange the spindles 9 in advance of the body portion of the axle, whereby a fulcrum is formed of the spindle, to cause the vehicle to counterbalance the weight of the tongue, to relieve the draft animal, and to prevent the tongue from straining its connections with the vehicle. Each spindle is provided at its inner end with a shank 14, which is arranged in a socket opening 15 at the inner terminals of the arms 8, which are formed integral with each other, consisting of a curved bar centrally enlarged to obtain sufficient strength at the socket; and the terminal of the shank 14 is threaded to receive a nut $15^a$, which is arranged at the inner side of the curved bar that forms the arms 8. In reducing the inner end of the spindle to form the shank 14, a shoulder is provided, which fits against the outer terminals of the socket 15.

The outer terminals of the curved arms of the axle and the spindles thereof are perforated for the reception of pivot-bolts 16; and the upper arms of the spindles are provided with integral crank arms 17 extending forward and downward and connected by a transverse rod 18 with the tongue, whereby when the latter is swung to one side or the other, the crank spindles 9 and consequently the front wheels, will respond to such movements in turning the vehicle.

The front axle is capable of a limited vertical movement. It is arranged in vertical guides 19, and is connected by links 20 with the ends of a transverse leaf spring 21; and these links 20 depend from the upper terminals of the arms 12, and form stirrups for the ends of the leaf spring 21. The leaf spring is centrally clipped or otherwise secured to a bolster or spring bar 22, which is fastened under the elevated portion 3 at the front of the vehicle. The lower terminals of the guides 19 are bent horizontally, extended rearwardly, and secured to the lower face of the drop portion of the vehicle, and the upper terminals of the vertical guides are bent forwardly at right angles, and are bolted or otherwise secured to the vehicle under the elevated portion 3 at the front thereof. The upper portions 23 of the vertical guides are forwardly offset to clear the leaf spring, and wear plates 24 are interposed between the body portion of the axle and the guides, and are secured to the beam 5 to prevent the latter from being worn through contact with the guides.

In order to prevent any longitudinal movement of the front axle, a horizontally disposed guide plate 25 is secured to the rear face of the body portion of the axle centrally thereon, and is provided with a vertical way formed by integral flanges 26, the way being adapted for a vertical rib or bar 27, secured to the front of the vehicle. This construction allows the axle the necessary vertical movement for the action of the spring, but does not permit any longitudinal shifting. The rib is preferably rectangular in horizontal section, and fits snugly between the flanges 26, a slight space being left between the front face of the rib and the guide plate, in order to permit the operation of cushions 28. These cushions consist each of a yielding plate 29, loosely mounted on the axle by means of horizontal bolts 30, springs spirally coiled and disposed on the bolts, and vertical bearing bars 32, arranged at opposite sides of the front of the vehicle, one bar being provided for each cushion. The spiral springs 31 are interposed between the plates 29 and the axle, and serve to hold the latter snugly against the vertical guides, and to cushion any jars or jolting.

The tongue 33 is preferably provided with the usual curved cross-bar 34, but may be connected by other suitable means, if desired, and instead of employing the said spiral spring 31, blocks of rubber may be substituted or similar means may be provided. The cross-bar 34 of the tongue, is coupled to a transverse bar 35, having a rearward extending stem 36, forming with the transverse bar a T-shaped coupling frame, which is supported by rearwardly converging braces 37, and which has the transverse rod 18 pivoted directly to it by means of a bolt 38. The rear end of the stem 36 of the T-shaped frame is coupled to the axle by means of a pintle bolt 39 passing through the said stem and arranged in perforations of forwardly extending ears 40, formed integral with the upper and lower bars 11 and 10 of the axle. When the tongue is swung from one side to the other in turning a vehicle, the crank spindles of the front axle simultaneously turn, to cause the front wheels to respond to the movements of the tongue; and it will be apparent that the front axle is prevented from twisting in its guides as the weight of the tongue is counterbalanced by the vehicle body. It will also be seen that the construction is simple and comparatively inexpensive in construction, that it possesses great strength and durability, and that in its operation it is positive and reliable. It will be seen that the front axle is fully cushioned, that it is capable of vertical movement, and that it is held against any longitudinal motion.

Changes in the form, proportion, and the minor details of construction may be resorted to without departing from the principle or sacrificing any of the advantages of this invention, such as arranging the front axle to suit the vehicle on which it is designed to be used, as illustrated in Fig. 6 of the accompanying drawings. In this figure the guides are mounted on the front of the vehicle body, instead of under the extreme front, as illustrated in Fig. 1 of the accompanying drawings.

In Fig. 6 the vertical guides are provided at their upper ends with rearwardly disposed L-shaped arms, which are secured to the front of the vehicle.

What I claim is—

1. In a vehicle, the combination of the body portion of an axle provided at its ends with upper and lower outward extending arms forwardly offset, and the crank spindles pivotally attached to the arms of the axle body, and located in advance of the body portion of the axle whereby the weight of a tongue and whiffletrees is counterbalanced by the weight of the body of a vehicle, substantially as described.

2. In a vehicle, an axle provided with forwardly offset spindles located in advance of the body portion of the axle, whereby they form fulcrums to counterbalance the weight of a tongue, substantially as and for the purpose described.

3. In a vehicle, the combination of a body provided at its front with vertical guides, a transversely-disposed spring located in the guides and connected with the body, an axle disposed transversely of the body and located in the guides beneath the spring and provided with upper and lower outwardly-extending arms and having upward-extending arms connected with the ends of the spring, the spindles having upper and lower arms pivotally connected to the outward extending arms of the axle, and means for connecting the spindles, substantially as described.

4. In a vehicle, the combination of a body, vertical guides arranged thereon, an axle body comprising a beam 5, an upper bar secured to the beam and terminating in upward extending arms, a lower bar secured to the beam and terminating in lower outward extending arms, and the upper arm 6 arranged at the ends of the beam, a transverse spring arranged in the guides and having its ends connected with the upward extending arms of the axle body, the integral upper and lower spindle arms having central sockets and pivoted to the outward extending arms of the axle body and terminating in forward extending crank arms, and spindles detachably secured in the sockets, substantially as described.

5 In a vehicle, the combination of a body having vertically disposed guide bars provided with forwardly offset upper portions, a transverse spring located at the upper portions of the guide bars, an axle body located in the lower portion of the guide bars and suspended from the spring, and crank spindles pivotally connected with the axle body, substantially as described.

6. In a vehicle, the combination of a body having vertical guides, an axle arranged therein, a spring supporting the axle and connected with the vehicle body, and a guide plate interposed between the axle and the body and provided with a vertical way engaged by the body, whereby the axle is prevented from moving longitudinally, substantially as described.

7. In a vehicle, the combination of a body provided with a vertical guide bar, an axle arranged therein, a spring supporting the axle, and cushions interposed between the axle and the body, substantially as described.

8. In a vehicle, the combination of a body provided at its front with vertical guide bars, an axle arranged therein, a spring supporting the axle, and cushions interposed between the rear face of the axle and the vehicle and comprising vertical bearing bars mounted on the body and the yielding face loosely mounted on the axle and engaging the bearing bars, substantially as described.

9. In a vehicle, the combination of a body provided at its front with vertical guide bars, an axle arranged therein, a spring supporting the axle, and cushions interposed between the rear face of the axle and the vehicle and comprising vertical bearing bars secured to the body, bolts extending rearward from the axle, plates loosely mounted on the bolt and engaging the bearing bars, and spiral springs disposed on the bolts and interposed between the axle and the plates, substantially as described.

10. In a vehicle, the combination of a body provided at its front with vertical guide bars, an axle arranged within the guide bars, a spring supporting the axle, a guide plate secured to the rear face of the axle and provided with vertical flanges forming a way, a rib secured to the body and arranged in the said way, and cushions interposed between the axle and the body, substantially as described.

11. In a vehicle, the combination of a vehicle body provided at its front with vertical guide bars, an axle body arranged in the guide bars and provided at its ends with upper and lower outward extending arms, spindles having upper and lower arms pivoted to those of the axle body and provided with crank arms, a T-shaped coupling frame connected with the axle, a transverse rod having its ends attached to the crank arms of the spindles and connected intermediate of its ends to the T-shaped coupling frame, and a tongue connected with the coupling frame, substantially as described.

In testimony that I claim the foregoing as my own I have hereto affixed my signature in the presence of two witnesses.

MARCUS P. JACOBSEN.

Witnesses:
JOHN H. SIGGERS,
GEO. C. SHOEMAKER.